United States Patent
Muraoka et al.

(10) Patent No.: US 11,636,338 B2
(45) Date of Patent: Apr. 25, 2023

(54) DATA AUGMENTATION BY DYNAMIC WORD REPLACEMENT

(71) Applicant: INTERNATIONAL BUSINESS MACHINES CORPORATION, Armonk, NY (US)

(72) Inventors: Masayasu Muraoka, Tokyo (JP); Tetsuya Nasukawa, Kanagawa-ken (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 392 days.

(21) Appl. No.: 16/825,650

(22) Filed: Mar. 20, 2020

(65) Prior Publication Data
US 2021/0295149 A1    Sep. 23, 2021

(51) Int. Cl.
| G06F 40/30 | (2020.01) |
| G06F 40/289 | (2020.01) |
| G06F 40/166 | (2020.01) |
| G06N 3/08 | (2023.01) |
| G06N 7/01 | (2023.01) |
| G06N 7/00 | (2023.01) |

(52) U.S. Cl.
CPC ............ *G06N 3/08* (2013.01); *G06F 40/166* (2020.01); *G06F 40/289* (2020.01); *G06F 40/30* (2020.01); *G06N 7/01* (2023.01)

(58) Field of Classification Search
CPC ........ G06N 3/08; G06N 7/005; G06N 3/0445; G06N 3/0454; G06F 40/166; G06F 40/289; G06F 40/30; G06F 40/247; G06F 40/279

USPC .......................................................... 706/21
See application file for complete search history.

(56) References Cited

U.S. PATENT DOCUMENTS

| 7,664,629 B2 | 2/2010 | Dymetman et al. |
| 2006/0247914 A1 | 11/2006 | Brener et al. |
| 2019/0197109 A1 | 6/2019 | Peters et al. |
| 2020/0311738 A1* | 10/2020 | Gupta ................ G06F 16/22 |
| 2021/0004432 A1* | 1/2021 | Li ...................... G06F 40/30 |

FOREIGN PATENT DOCUMENTS

WO    2017055878 A1    4/2016

OTHER PUBLICATIONS

Hochreiter et al., "Long Short-Term Memory", Neural Computation, Nov. 1997, pp. 1-32.

(Continued)

*Primary Examiner* — Thierry L Pham
(74) *Attorney, Agent, or Firm* — Tutunjian & Bitetto, P.C.; Randy Emilio Tejeda

(57) ABSTRACT

A computer-implemented method is provided for data augmentation. The method includes calculating, by a hardware processor for each of words in a text data, a word replacement probability based on a word occurrence frequency in the text data, wherein the word replacement probability decreases with increasing word occurrence frequency. The method additionally includes selectively replacing at least one of the words in the text data with words predicted therefor by a Bidirectional Neural Network Language Model (BiNNLM) to generate augmented text data, based on the word replacement probability.

25 Claims, 10 Drawing Sheets

(56) References Cited

OTHER PUBLICATIONS

Jang et al., "Categorical Reparameterization With Gumbel-Softmax", arXiv:1611.01144v5 [stat.ML] 5, Aug. 2017, pp. 1-13.
Kingman et al. "ADAM: A Method for Stochastic Optimization", arXiv:1412.6980v9 [cs.LG] Jan. 30, 2017, pp. 1-15.
Kobayashi, s., "Contextual Augmentation: Data Augmentation by Words with Paradigmatic Relations", Proceedings of NAACL-HLT 2018, Jun. 2018, pp. 452-457.
Makarenkov et al., "Choosing the Right Word: Using Bidirectional LSTM Tagger for Writing Support Systems", arXiv:1901.02490v1 [cs.CL] Jan. 8, 2019, pp. 1-27.
Lin et al., "Microsoft COCO: Common Objects in Context", arXiv:1405.0312v3 [cs.CV] Feb. 21, 2015, pp. 1-15.
Zhu et al., "IBM Watson Content Analytics Discovering Actionable Insight from Your Content", ibm.com/redbooks, Jul. 2014, pp. 1-598.
Colah's Blog, "Understanding LSTM Networks", available at: http://colah.github.io/posts/2015-08-Understanding-LSTMs/img/LSTM3-chain.png, Aug. 2015, 8 pages.
Mell et al. "The NIST Definition of Cloud Computing", NIST Special Publication 800-145, 2011, 7 pages.

\* cited by examiner

DATA AUGMENTATION BY DYNAMIC WORD REPLACEMENT

BACKGROUND

The present invention generally relates to data processing, and more particularly to data augmentation by dynamic word replacement based on word frequencies.

Often, the data prevalent in the Internet and/or stored in companies, enterprises, and organizations will differ from the data arranged for research purposes (e.g., image captioning, document classification, and so forth) in that they will show different characteristics. In particular, the data not arranged for research purposes often suffers from the problem of data sparseness due to the vocabulary explosion because the number of infrequent words dramatically increases as the data size grows. Also, supervised dataset construction requires manual annotations of gold labels, which results in a tremendous cost. Data augmentation is a method to synthesize pseudo supervised data based on a small amount of supervised data. Data augmentation has been applied to different types of data including image data, text data, and acoustic data.

SUMMARY

According to aspects of the present invention, a computer-implemented method is provided for data augmentation. The method includes calculating, by a hardware processor for each of words in a text data, a word replacement probability based on a word occurrence frequency in the text data, wherein the word replacement probability decreases with increasing word occurrence frequency. The method additionally includes selectively replacing at least one of the words in the text data with words predicted therefor by a Bidirectional Neural Network Language Model (BiNNLM) to generate augmented text data, based on the word replacement probability.

According to other aspects of the present invention, a computer program product is provided for data augmentation. The computer program product includes a non-transitory computer readable storage medium having program instructions embodied therewith. The program instructions are executable by a computer to cause the computer to perform a method. The method includes calculating, for each of words in a text data, a word replacement probability based on a word occurrence frequency in the text data, wherein the word replacement probability decreases with increasing word occurrence frequency. The method additionally includes selectively replacing at least one of the words in the text data with words predicted therefor by a Bidirectional Neural Network Language Model (BiNNLM) to generate augmented text data, based on the word replacement probability.

According to yet other aspects of the present invention, a computer processing system is provided for data augmentation. The computer processing system includes a memory device including program code stored thereon. The computer processing system further includes a hardware processor, operatively coupled to the memory device, and configured to run the program code stored on the memory device to calculate, for each of words in a text data, a word replacement probability based on a word occurrence frequency in the text data, wherein the word replacement probability decreases with increasing word occurrence frequency. The hardware processor additionally runs the program code to selectively replace at least one of the words in the text data with words predicted therefor by a Bidirectional Neural Network Language Model (BiNNLM) to generate augmented text data, based on the word replacement probability.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to data augmentation by dynamic word replacement based on word frequencies.

In an embodiment, the present invention provides an approach for data augmentation that replaces words dynamically based on word frequencies as well as a neural language model to tackle the data sparseness problem.

In an embodiment, the present invention replaces words more likely if they occur less, thus alleviating the data sparseness by preserving important words. As used herein, the term "important words" refers to words that are critical in solving a task. Important words are typically highly correlated with a gold label (manually labeled ground truth).

In an embodiment, the present invention synthesizes a new sentence from an original sentence by probabilistically replacing words in the original sentence based on frequencies of words that occur in a text data.

Figure 1:
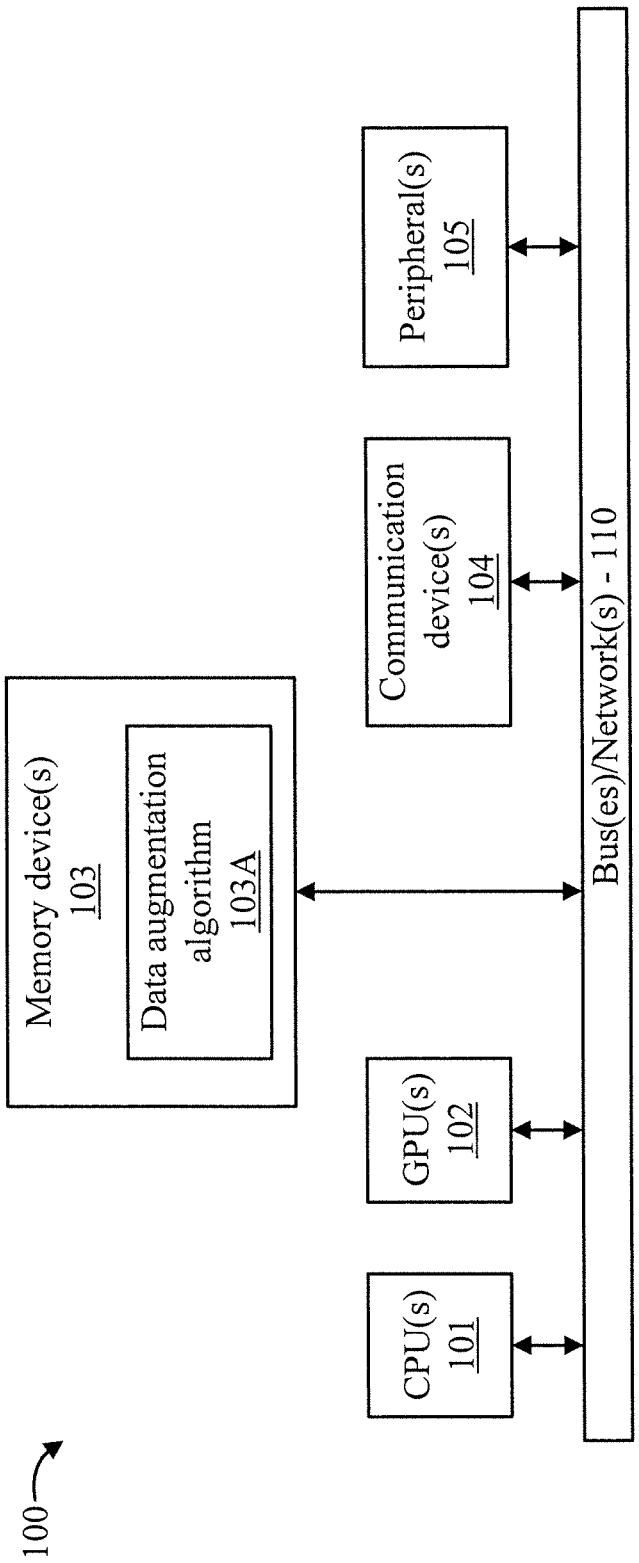
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of Graphical Processing Units (GPUs) 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, Random Access Memories (RAMs), Read-Only Memories (ROMs), and other memories (flash, optical, magnetic, etc.). The communication devices 104 can include wireless and/or wired communication devices (e.g., network (e.g., Wi-Fi, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In an embodiment, memory devices 103 include a special purpose data augmentation algorithm 103A for augmenting input data as described herein.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 9-10). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

One or more embodiments of the present invention use a Bidirectional Neural Network Language Model (BiNNLM).

A (conditional) BiNNLM learns a probabilistic distribution over pre-defined vocabulary given its context (and a label) as follows. This distribution can be computed as follows: $P(\bullet|S^{unlabeled}\backslash\{w_i\})$; and $P(\bullet|y, S^{labeled}\backslash\{w_i\})$, where S denotes a sentence consisting of a sequence of words, $\{w_1, w_n\}$ ranging from $w_1$ to $w_n$, and \ denotes relative complement of the right set in the left set. The $S^{unlabeled}$ and $S^{labeled}$ respectively represent an unlabeled sentence and labeled sentence whose label is y.

Given a sequence of words $\{w_1, w_n\}$ as a sentence, the BiNNLM first maps each of the words onto their corresponding embeddings $[x_1, \ldots, x_n]$ ($x_i \in \mathbb{R}^d$, d-dimensional real-valued vector) with an embedding matrix X, where X is a model parameter that is learned in training and d is a hyper-parameter.

A BiNNLM is advantageous over a conventional language model in that it can consider both the preceding and following context of a word.

Figure 2:
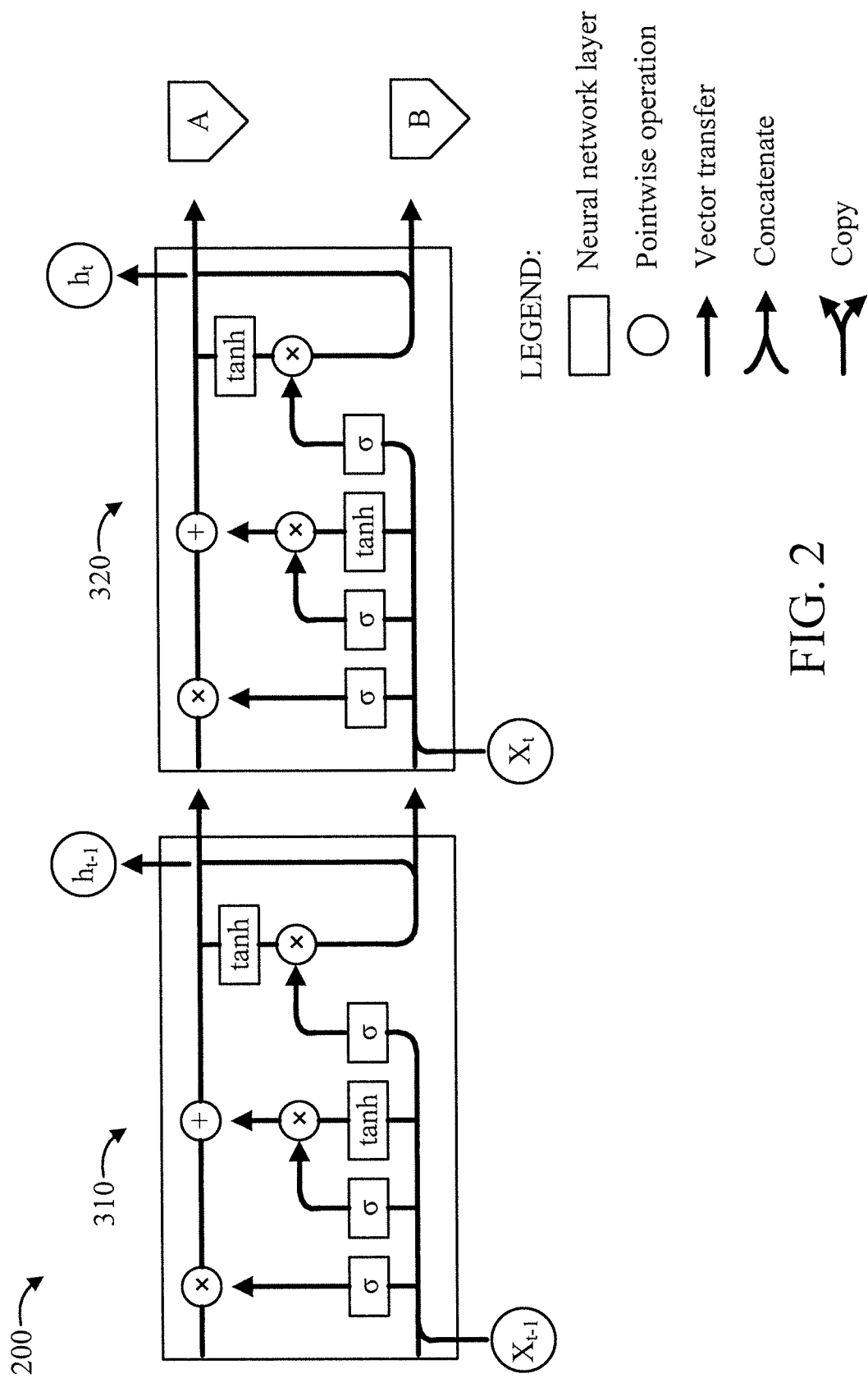
FIGS. 2-3 are block diagrams showing an exemplary Long Short-Term Memory (LSTM) to which the present invention can be applied, in accordance with an embodiment of the present invention.
Figure 3:
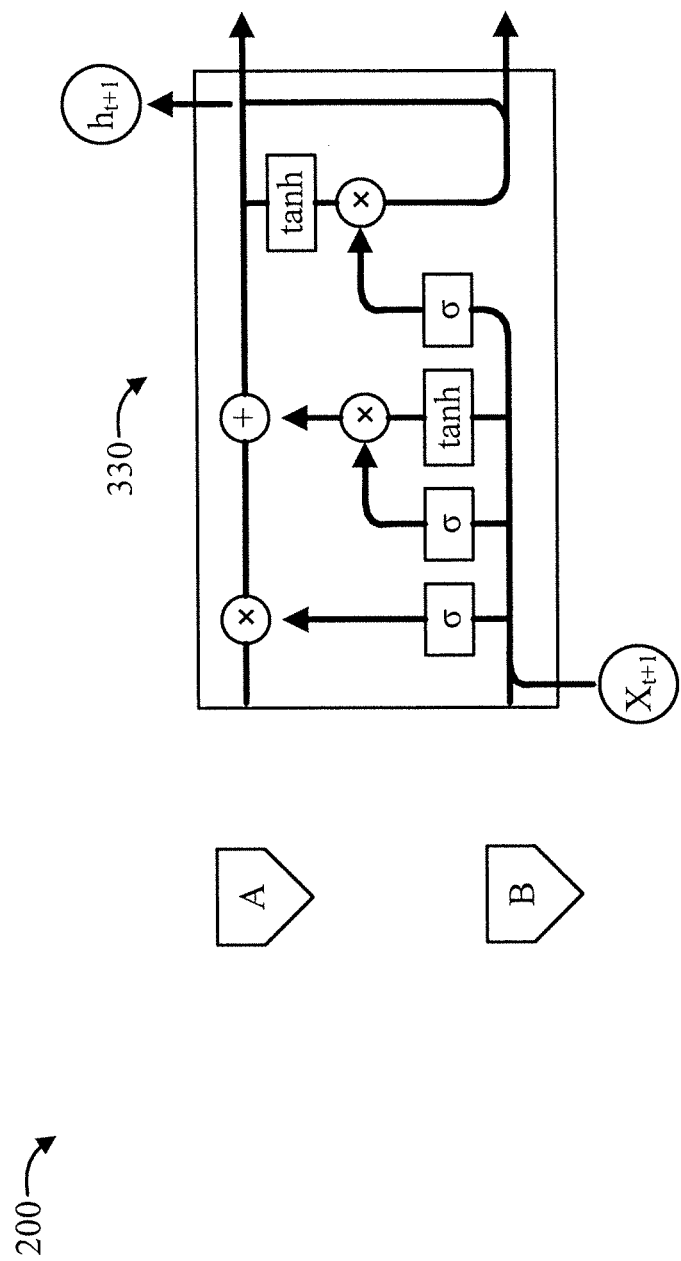

FIGS. 2-3 are block diagrams showing an exemplary Long Short-Term Memory (LSTM) 200 to which the present invention can be applied, in accordance with an embodiment of the present invention.

The LSTM 200 is formed from a chain of 3 LSTMs, namely LSTM 310, LSTM 320, and LSTM 330.

The LSTM 200 can compute a cell state $C_t \in \mathbb{R}^d$, as well as a hidden layer $h_t \in \mathbb{R}^d$, from the word embedding $x_t$ at time step t using the following equations:

$$f_t = \sigma(W_f \cdot [h_{t-1}, x_t] + b_f),$$

$$i_t = \sigma(W_i \cdot [h_{t-1}, x_t] + b_i),$$

$$o_t = \sigma(W_o \cdot [h_{t-1}, x_t] + b_o),$$

$$\tilde{C}_t = \tanh(W_c \cdot [h_{t-1}, x_t] + b_c),$$

$$C_t = f_t * C_{t-1} + i_t * \tilde{C}_t,$$

$$h_t = o_t * \tanh(C_t), \text{ and}$$

$$\sigma(x) = \frac{1}{1 + \exp(-x)}.$$

In the preceding equations, $W_o$, $b_o$, $W_f$, $b_f$, $W_i$, $b_i$, $W_c$, and $b_c$ are model parameters to be learned in training, and •, *, [ ], and σ respectively represent matrix production, element-wise production, matrix concatenation, and a sigmoid function. $f_t$, $i_t$, and $i_t$ respectively denote a forget, input, and output gate. A sigmoid function can output values between zero and one, describing how much of each component should be let through. A value of zero means "let nothing through," while a value of one means "let all through". The tan h layer creates a vector in values between minus one and one, that could be multiplied with the input or output gate of the LSTM 200.

The LSTM is stacked to form an N-layered LSTM 200 by using a hidden layer $h_t$ in a LSTM 320 as an input in another LSTM 330 stacked on top of LSTM 320. LSTM 310 is the first LSTM in the stack.

If dropout is applied, values in an input vector are randomly dropped with probability "ratio" (hyper-parameter) and the remaining values are scaled by a factor 1/(1-ratio).

A Bidirectional LSTM includes at least two different LSTMs as follows: one LSTM computes in the forward direction ($[h_1, \ldots, h_a]$) and the other LSTM computes in the backward direction ($[h_n, h_1]$).

The hidden layer h from the N-layered LSTM is used to compute the following distribution through a Multi-Layer Perceptron (MLP) and Gumbel softmax:

$$P(\bullet|S\backslash\{w_i\}) = \text{Gumbel\_softmax}(y^*),$$

$$y^* = \text{MLP}(h),$$

$$x_i = \frac{\exp\left(\frac{g_i + \log(x_i)}{\tau}\right)}{\sum_j \left(\frac{g_j + \log(x_j)}{\tau}\right)}$$

in the output of Gumbel_softmax(x), $$\text{MLP}(h) = \text{ReLU}(W \bullet h + b), \text{ and}$$

$$\text{ReLU}(x) = \max(0, x).$$

In the preceding equations, g and τ respectively denote a sample drawn from Gamble distribution and a temperature. W and h are model parameters to be learned in training.

For a conditional BiNNLM, add one layer for integrating label information as follows:

$$y^* = \text{MLP}(h) + W_y \bullet \text{one\_hot}(y),$$

where the one_hot function returns a vector consisting of 1 for the element corresponding to y and 0 for the others.

Figure 4:
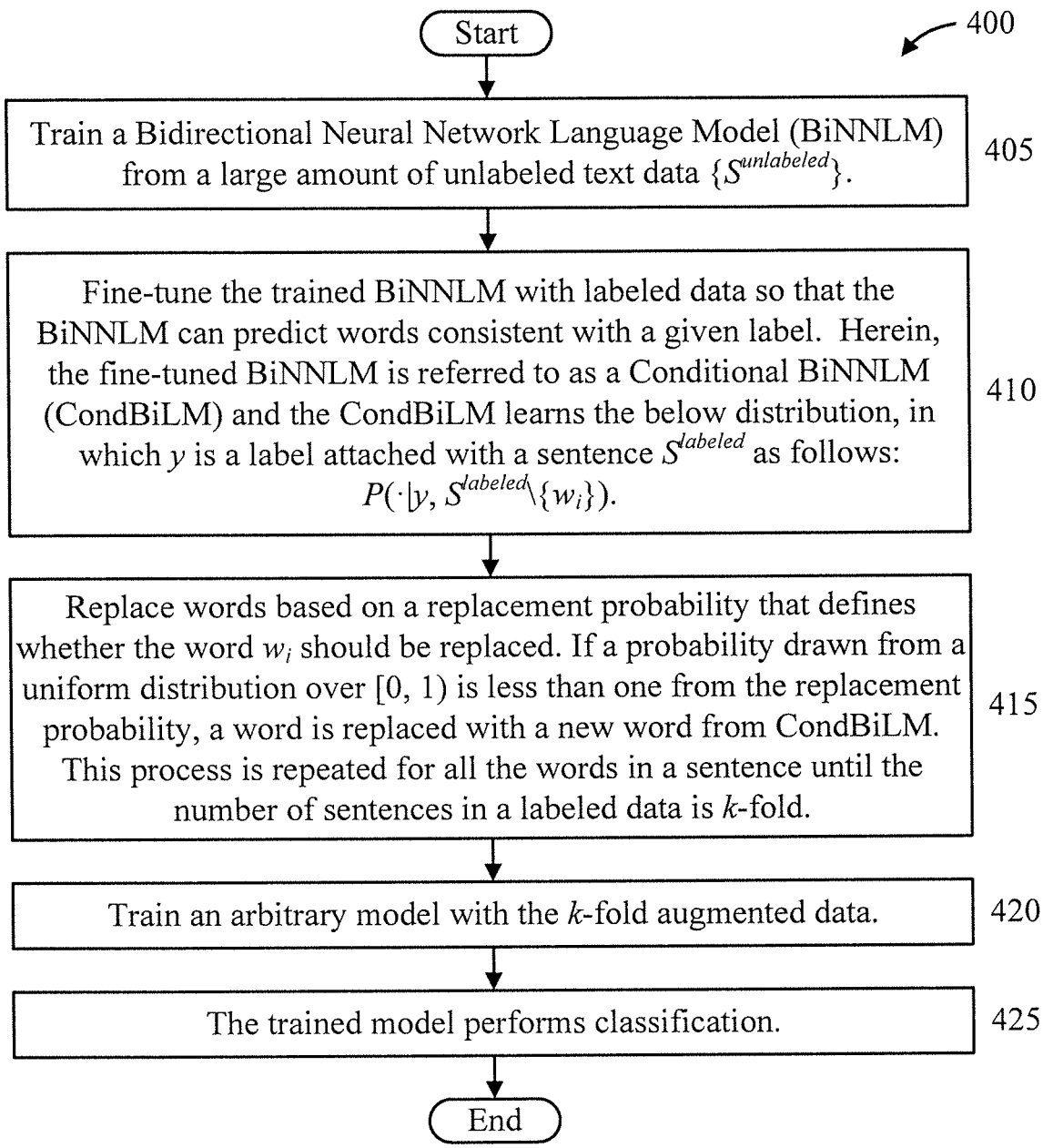
FIG. 4 is a flow diagram showing an exemplary method for data augmentation, in accordance with an embodiment of the present invention.

FIG. 4 is a flow diagram showing an exemplary method 400 for data augmentation, in accordance with an embodiment of the present invention.

At block 405, a Bidirectional Neural Network Language Model (BiNNLM) is trained from a large amount of unlabeled text data $\{S^{unlabeled}\}$.

Thus, given a sentence $S^{unlabeled}$ consisting of a list of words $[w_1, \ldots, w_n]$, a BiNNLM is trained to predict an i-th word $w_i$ from its surrounding words in the sentence $S^{unlabeled}\backslash\{w_i\}$. The BiNNLM is represented as the following probabilistic distribution: $P(\bullet|S^{unlabeled}\backslash\{w_i\})$.

At block 410, the trained BiNNLM is fine-tuned with labeled data so that the BiNNLM can predict words consistent with a given label. Herein, the fine-tuned BiNNLM is referred to as a Conditional BiNNLM (CondBiLM) and the CondBiLM learns the below distribution, in which y is a label attached with a sentence $S^{labeled}$ as follows: $P(\bullet|y, S^{labeled}\backslash\{w_i\})$.

At block 415, words are replaced based on a replacement probability that defines whether the word $w_i$ should be replaced. If a probability drawn from a uniform distribution over [0, 1) is less than the replacement probability, a word is replaced with a new word from CondBiLM. This process is repeated for all the words in a sentence until the number of sentences in a labeled data is k-fold.

In an embodiment, the replacement probability for $w_i$ can be as follows:
$P(\text{replaceable}|\text{freq}(w_i)) \propto \exp(1-\text{freq}(w_i))$, in which the function freq returns the frequency of the occurrence of the word $w_i$ in given unlabeled and labeled data.

At block 420, an arbitrary classification model is trained with the k-fold augmented data.

At block 425, the trained model performs classification.

Figure 5:
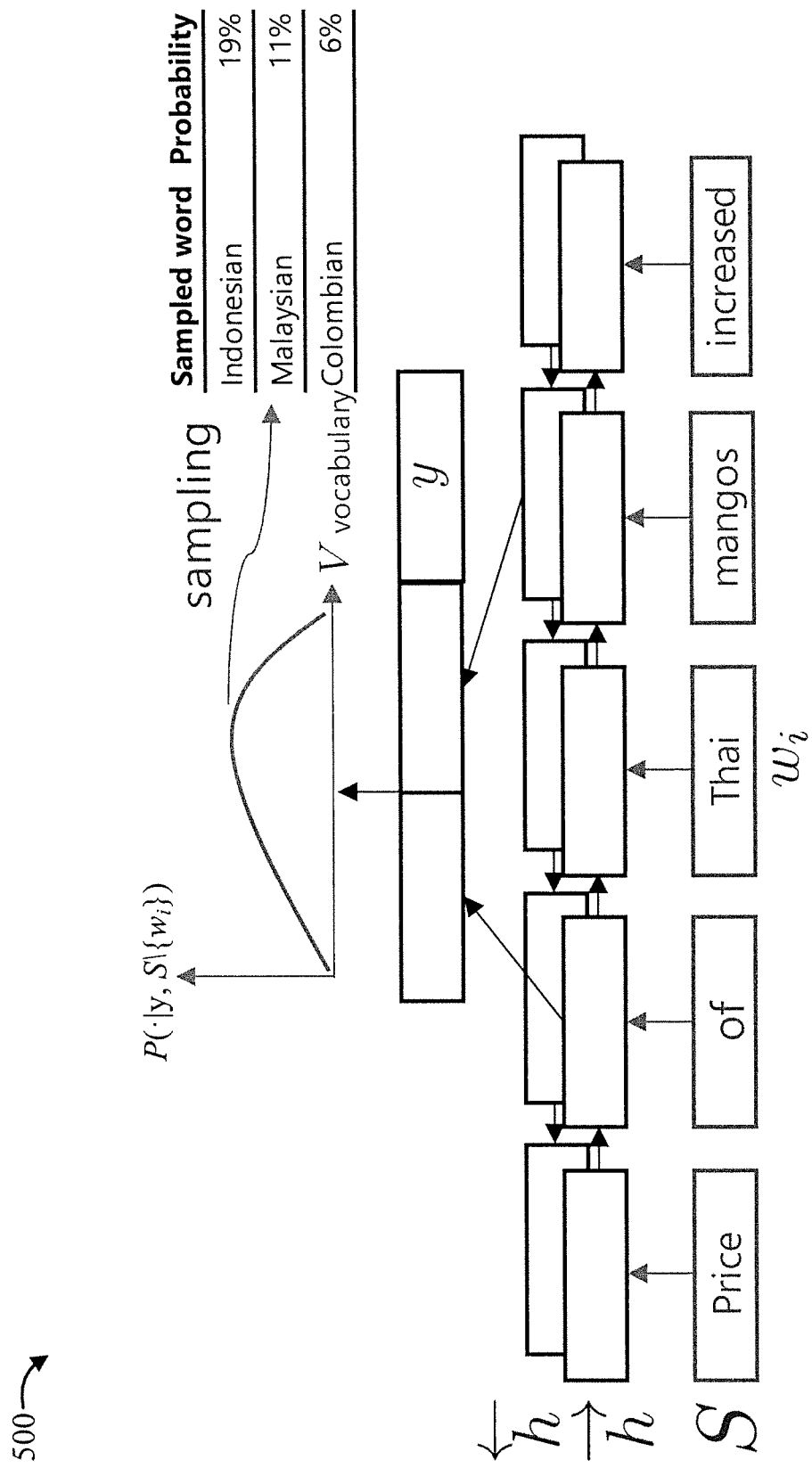
FIG. 5 is a diagram showing an exemplary prediction mechanism by a conditional BiNNLM, in accordance with an embodiment of the present invention.

FIG. 5 is a diagram showing an exemplary prediction mechanism 500 by a conditional BiNNLM, in accordance with an embodiment of the present invention.

Consider a given sentence S as follows: "Price of Thai mangos increased", where $w_i$ corresponds to the word "Thai".

A first LSTM operates in the forward direction $\vec{h}$, while a second LSTM operates in the backward direction $\overset{\leftarrow}{h}$. y denotes a label "lack of ingredient".

With respect to a plot of $P(\bullet|y, S\backslash\{w_i\})$ (y-axis) versus vocabulary V (x-axis), a sampling is performed to obtain the following results, as shown in TABLE 1 below and also in FIG. 5:

TABLE 1

| Sampled word | Probability |
|---|---|
| Indonesian | 19% |
| Malaysian | 11% |
| Columbian | 6% |

When words which moderately appear in a given data (e.g., "Thai", "mangos" in FIG. 5) do not actually contribute the prediction of the label, they should be replaced with many other words that have similar characteristics so that a model can assign more weights with words (e.g., "increased") that may contribute the prediction of the label.

Figure 6:
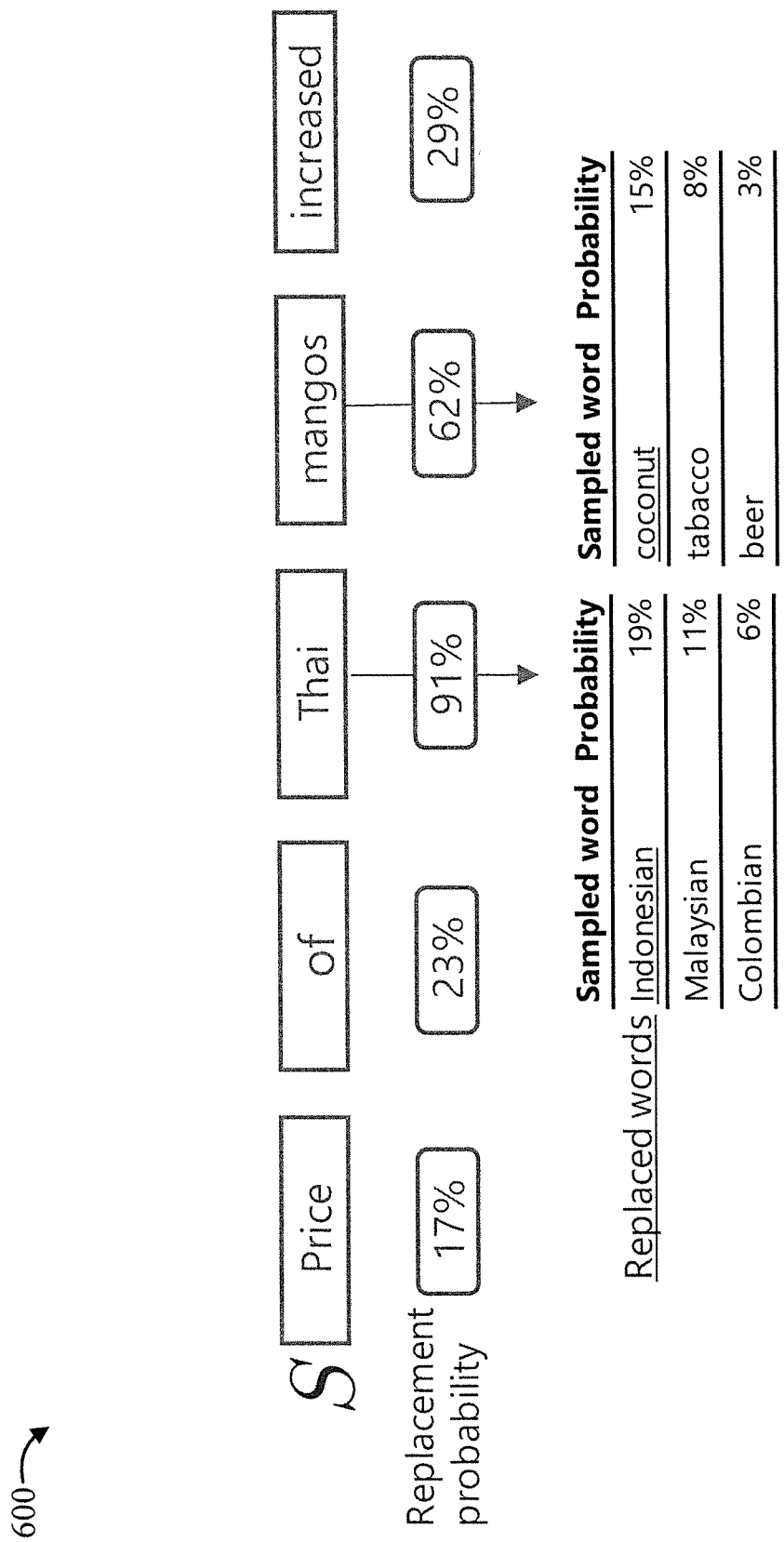
FIG. 6 is a diagram showing an exemplary data augmentation process, in accordance with an embodiment of the present invention.

FIG. 6 is a diagram showing an exemplary data augmentation process 600, in accordance with an embodiment of the present invention. The data augmentation process 600 is performed with respect to the prediction mechanism 500 of FIG. 5.

Still consider the given sentence S as follows: "Price of Thai mangos increased".

The replacement probabilities are calculated based on the frequencies and can be as follows:
17% for the word "Price",
23% for "of",
91% for "Thai",
62% for "mangos", and
29% for "increased".

If the replacement probability for a word is greater than that taken from a uniform distribution over [0, 1), the word is replaced with another word based on the distribution obtained through the CondBiLM. According to the preceding replacement probabilities, the words "Thai" and "mangos" are more likely to be replaced. TABLE 2 lists examples of words with the highest probabilities in $P(\bullet|y, S\backslash\{w_i\})$, where $w_i$ is "mangos". When the words "Thai" and "mangos" are decided to be replaced, the replaced words can respectively be, for example, "Indonesian" and "Coconut".

TABLE 2

| Sampled words | Probability |
|---|---|
| Coconut | 15% |
| Tobacco | 8% |
| Columbian | 3% |

A description will now be given regarding various possible extensions to the present principles, in accordance with various embodiments of the present invention.

These extensions of the present invention are intended to contribute the performance improvement of target classifiers.

In an embodiment, one possible extension can involve configuring hyper-parameters such as the magnitude of augmentation k, coefficient of replacement probability, and choice of Part of Speech (POS) of words being augmented according to the available data. These hyper-parameters are configured based on the data and/or employed classification model.

In an embodiment, another possible extension can involve assigning a confidence weight with augmented data, in which the weight is calculated based on the probability of the CondBiLM and replacement probability. In an embodiment, the weight is calculated over the sentence by multiplying both the probabilities for all the words that occurred replacement.

In an embodiment, yet another possible extension can involve extending language models to predict phrases instead of a word. For example, formally, given a context $S \backslash \{w_{i:j}\}$ and a gold label, the conditional BiNNLM predicts a phrase based on the following probabilities: $P(\bullet | y, S \backslash \{w_{i:j}\})$.

Figure 7:
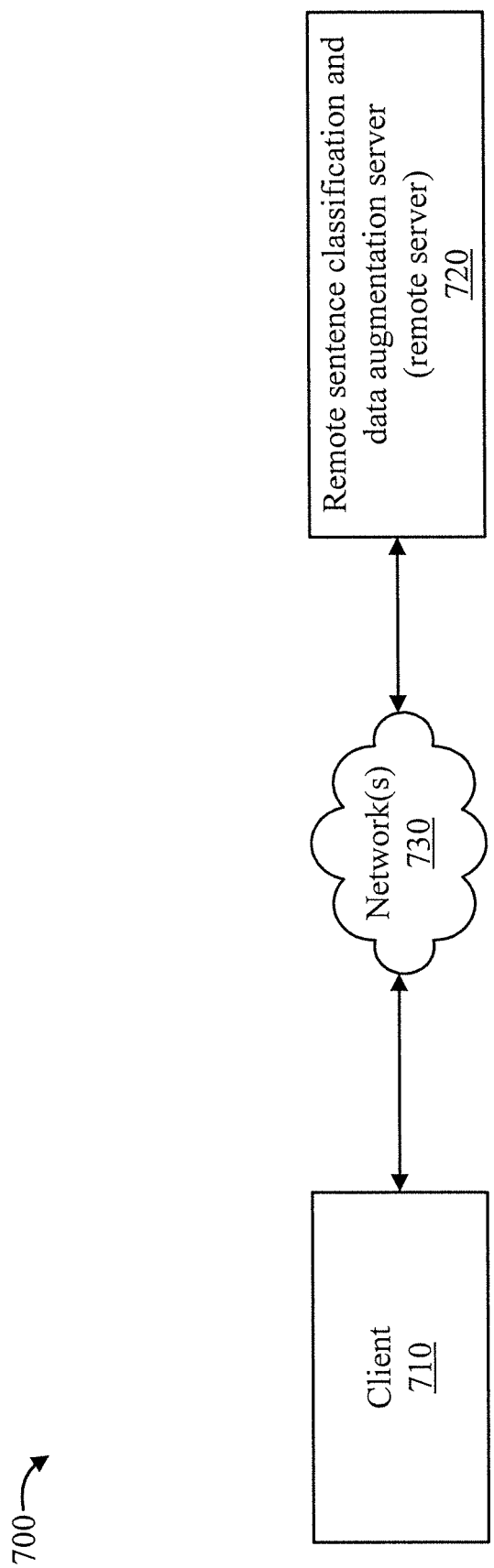
FIG. 7 is a diagram showing an exemplary environment, in accordance with an embodiment of the present invention.

FIG. 7 is a diagram showing an exemplary environment 700, in accordance with an embodiment of the present invention.

The environment 700 includes a client device (hereinafter "client") 710 and a remote sentence classification and data augmentation server (hereinafter "remote server") 720. While one of each is shown for the sake of brevity, in other embodiment more than one of the preceding elements can be included in an environment in accordance with the present invention. The client 710 interfaces with the remote server 720 over one or more networks 730 to provide one or more sentences and receive, in return, the classification labels. In an embodiment, the corresponding sentence may also be included in the output from the server together with the classification labels to provide a complete set of information for a given sentence. Sentence classification is performed using a classification model. A BiNNLM is trained with unlabeled and labeled text data in advance to generate augmented text data, where the augmented text data can be a specially processed version of a sentence possibly including different words than the original sentence. In an embodiment, the specially processed version is the sentence where one or more proper nouns are replaced with possibly different (proper) nouns. In an embodiment, the invention is employed for sentiment classification in a sentiment classification pipeline having an augmentation feature in accordance with the present invention.

Figure 8:
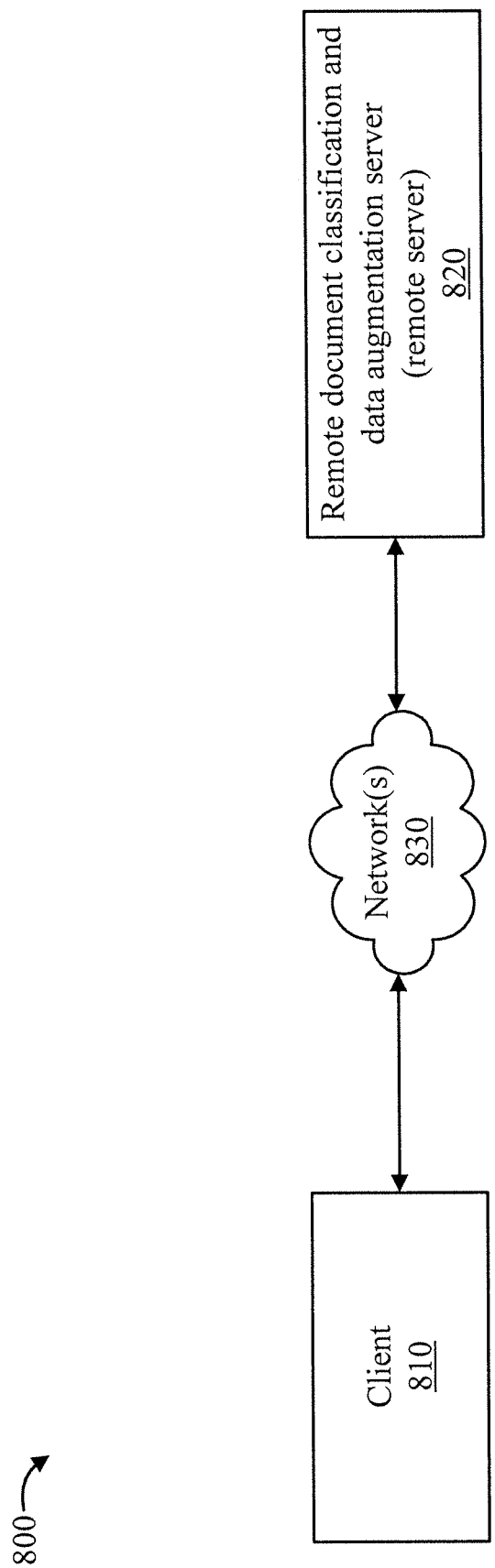
FIG. 8 is a diagram showing another exemplary environment, in accordance with an embodiment of the present invention.

FIG. 8 is a diagram showing another exemplary environment 800, in accordance with an embodiment of the present invention.

The environment 800 includes a client device (hereinafter "client") 810 and a remote document classification and data augmentation server (hereinafter "remote server") 820. While one of each is shown for the sake of brevity, in other embodiment more than one of the preceding elements can be included in an environment in accordance with the present invention. The client 810 interfaces with the remote server 820 over one or more networks 830 to provide one or more documents and receive, in return, classification labels of the documents. In an embodiment, the corresponding document may also be included in the output from the server together with the classification results to provide a complete set of information for a given document. Document classification is performed using a classification model. As examples of document classification, the present invention can be applied to news articles. In other embodiment, classification can be performed on financial, legal, or medical text. From such classification, a next step may be that a machine helps bankers, layers, and/or doctors dispense a treatment and/or accept a form of payment, and so forth. In an embodiment, the remote server 820 can be configured to retrieve related documents and, wherein training a BiNNLM, other documents related to that classification can be retrieved from the Internet. In such a case, server 820 may be a remote server for document classification, data augmentation, and document retrieval.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
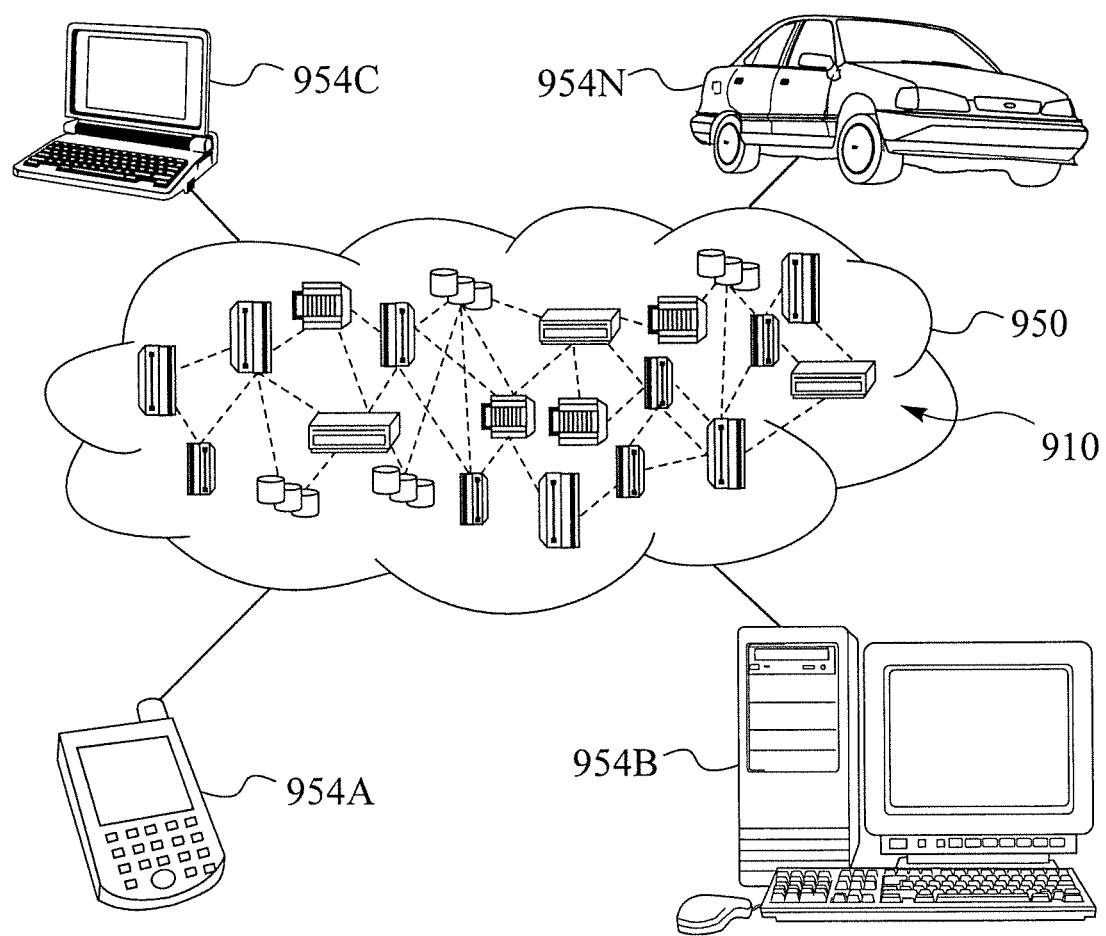
FIG. 9 is a block diagram showing an illustrative cloud computing environment having one or more cloud computing nodes with which local computing devices used by cloud consumers communicate, in accordance with an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
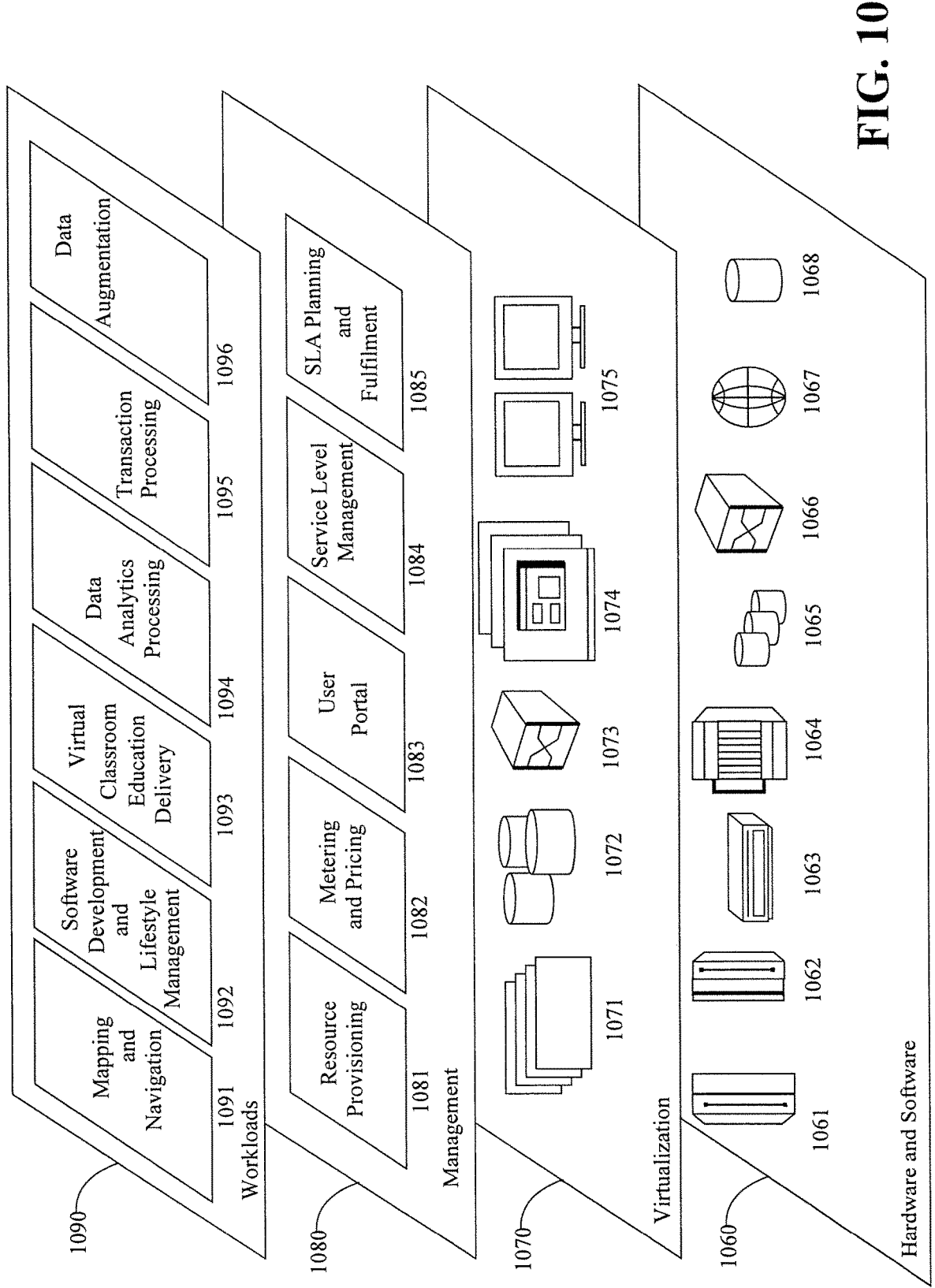
FIG. 10 is a block diagram showing a set of functional abstraction layers provided by a cloud computing environment, in accordance with an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 974; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and data augmentation 1096.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for data augmentation, comprising:
    calculating, by a hardware processor for each of words in a text data, a word replacement probability based on a word occurrence frequency in the text data, wherein the word replacement probability decreases with increasing word occurrence frequency; and
    selectively replacing at least one of the words in the text data with words predicted therefor by a Bidirectional Neural Network Language Model (BiNNLM) to generate augmented text data, based on the word replacement probability.

2. The computer-implemented method of claim 1, further comprising:
    training the BiNNLM with unlabeled training text data to obtain a trained BiNNLM; and
    fine-tuning the trained BiNNLM with labeled training text data to obtain a fine-tuned BiNNLM configured to predict words, based on one or more surrounding words, consistent with given labels, wherein the fine-tuned BiNNLM is used to perform said selectively replacing step.

3. The computer-implemented method of claim 1, further comprising assigning a confidence weight to each of the words in the augmented text data based on the word replacement probability calculated for each of the words in the text data corresponding thereto.

4. The computer-implemented method of claim 1, further comprising configuring hyperparameters according to available data from among the labeled training text data, the unlabeled training text data, and the text data.

5. The computer-implemented method of claim 4, wherein the hyperparameters comprise a magnitude of an augmentation to the text data, a coefficient of the word replacement probability, and a choice of parts of speech being augmented.

6. The computer-implemented method of claim 1, wherein language models used by the BiNNLM are extended to predict phrases comprising two or more words responsive to a context and a gold label.

7. The computer-implemented method of claim 1, wherein the BiNNLM comprises at least one Long Short-Term Memory (LSTM).

8. The computer-implemented method of claim 7, wherein the at least LSTM is an N-layered bidirectional LSTM, wherein N is an integer greater than one.

9. The computer-implemented method of claim 1, wherein the text data comprises summaries of one or more sentences for each of a set of images, and the method further comprises captioning one or more of the images using the augmented text data.

10. The computer-implemented method of claim 1, further comprising classifying a document that includes the text data based at least on the augmented text data, wherein the text data comprises one or more sentences.

11. The computer-implemented method of claim 1, wherein the words predicted to be consistent with the labels are comprised in one or more sentences associated at a sentence-level with the labels.

12. The computer-implemented method of claim 1, wherein the BiNNLM has a probabilistic distribution P: $P(\bullet|S^{unlabeled}\backslash\{w_i\})$, with $\bullet$ indicating a random variable, $S^{unlabeled}$ indicating a unlabeled sentence, and $w_i$ indicating a word to be predicted.

13. The computer-implemented method of claim 1, wherein the BiNNLM has a probabilistic distribution P: $P(\bullet|y, S^{labeled}\backslash\{w_i\})$, with $\bullet$ indicating a random variable, $S^{labeled}$ indicating a labeled sentence, y indicating a label associated with the labeled sentence, and $w_i$ indicating a word to be predicted.

14. A computer program product for data augmentation, the computer program product comprising a non-transitory computer readable storage medium having program instructions embodied therewith, the program instructions executable by a computer to cause the computer to perform a method comprising:
    calculating, for each of words in a text data, a word replacement probability based on a word occurrence frequency in the text data, wherein the word replacement probability decreases with increasing word occurrence frequency; and
    selectively replacing at least one of the words in the text data with words predicted therefor by a Bidirectional Neural Network Language Model (BiNNLM) to generate augmented text data, based on the word replacement probability.

15. The computer program product of claim 14, further comprising:
    training the BiNNLM with unlabeled training text data to obtain a trained BiNNLM; and
    fine-tuning the trained BiNNLM with labeled training text data to obtain a fine-tuned BiNNLM configured to predict words, based on one or more surrounding words, consistent with given labels, wherein the fine-tuned BiNNLM is used to perform said selectively replacing step.

16. The computer program product of claim 14, further comprising assigning a confidence weight to each of the words in the augmented text data based on the word replacement probability calculated for each of the words in the text data corresponding thereto.

17. The computer program product of claim 14, further comprising configuring hyperparameters according to available data from among the labeled training text data, the unlabeled training text data, and the text data.

18. The computer program product of claim 17, wherein the hyperparameters comprise a magnitude of an augmentation to the text data, a coefficient of the word replacement probability, and a choice of parts of speech being augmented.

19. The computer program product of claim 14, wherein language models used by the BiNNLM are extended to predict phrases comprising two or more words responsive to a context and a gold label.

20. The computer program product of claim 14, wherein the BiNNLM comprises at least one Long Short-Term Memory (LSTM).

21. The computer program product of claim 20, wherein the at least LSTM is an N-layered bidirectional LSTM, wherein N is an integer greater than one.

22. The computer program product of claim 14, further comprising classifying a document that includes the text data based at least on the augmented text data, wherein the text data comprises one or more sentences.

23. The computer program product of claim 14, wherein the words predicted to be consistent with the labels are comprised in one or more sentences associated at a sentence-level with the labels.

24. The computer program product of claim 14, wherein the BiNNLM has a probabilistic distribution P: $P(\bullet | S^{unlabeled} \backslash \{w_i\})$, with $\bullet$ indicating a random variable, $S^{unlabeled}$ indicating a unlabeled sentence, and $w_i$ indicating a word to be predicted.

25. A computer processing system for data augmentation, comprising:

a memory device including program code stored thereon;

a hardware processor, operatively coupled to the memory device, and configured to run the program code stored on the memory device to calculate, for each of words in a text data, a word replacement probability based on a word occurrence frequency in the text data, wherein the word replacement probability decreases with increasing word occurrence frequency; and selectively replace at least one of the words in the text data with words predicted therefor by a Bidirectional Neural Network Language Model (BiNNLM) to generate augmented text data, based on the word replacement probability.

* * * * *